Aug. 17, 1943.  D. W. GRAY ET AL  2,327,035
BUFFER STEM SLEEVE
Filed Oct. 3, 1940  3 Sheets-Sheet 1
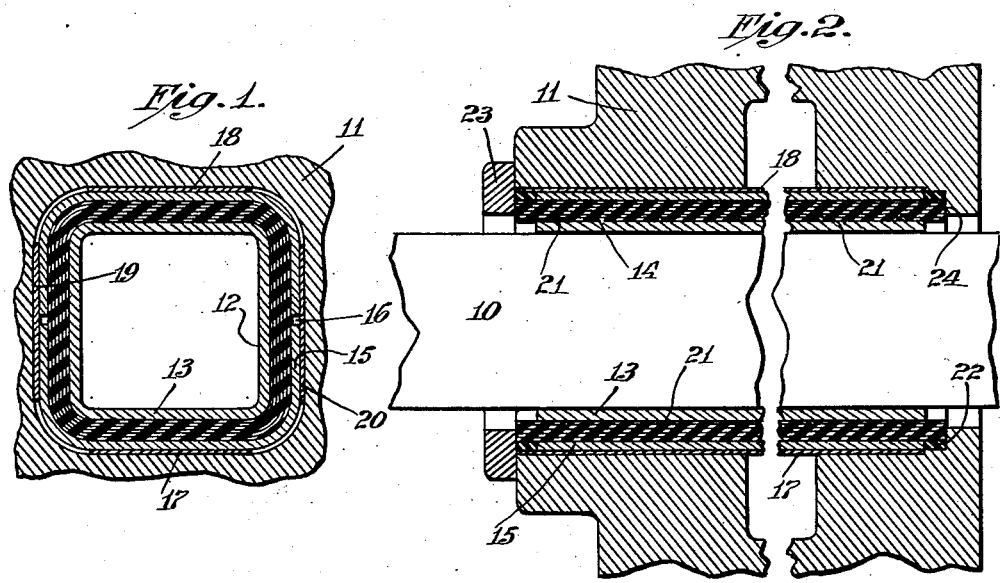
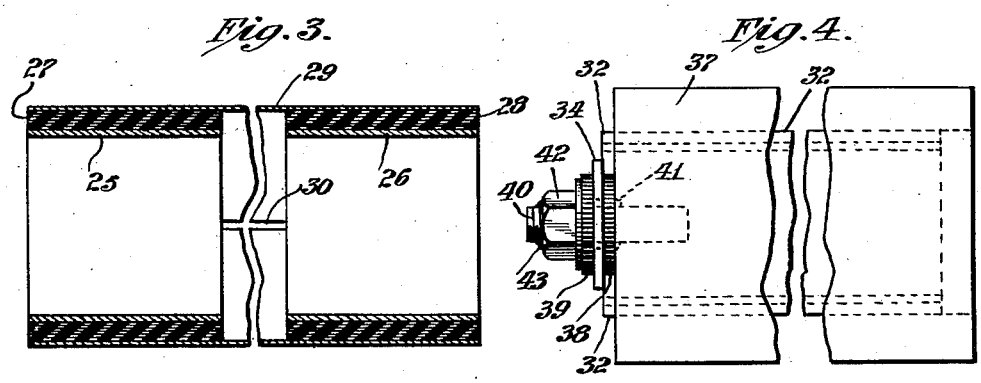
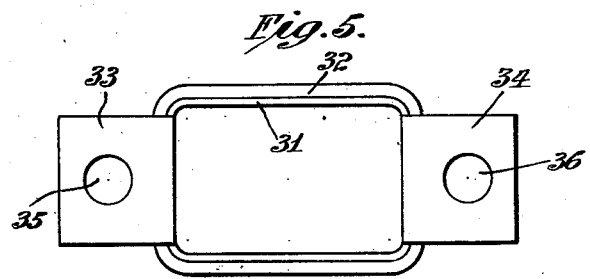
INVENTORS
David W. Gray
William B. Rogers Jr.
ATTORNEY Aug. 17, 1943.  D. W. GRAY ET AL  2,327,035
BUFFER STEM SLEEVE
Filed Oct. 3, 1940  3 Sheets-Sheet 2

INVENTORS
David W. Gray
William B. Rogers Jr.
BY
ATTORNEY

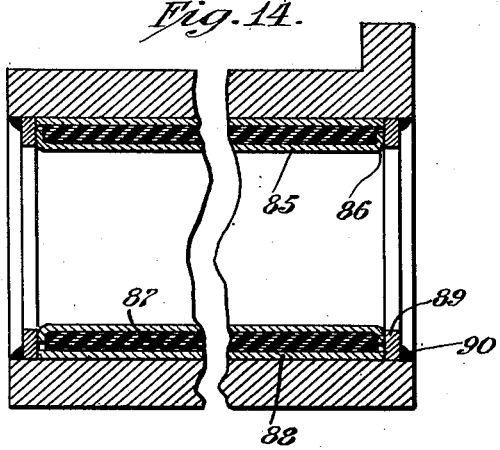
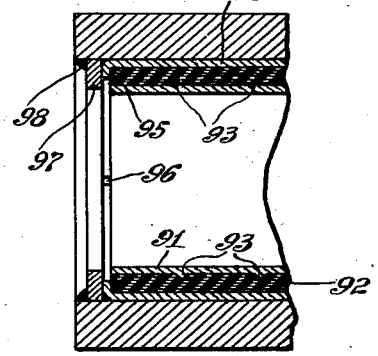
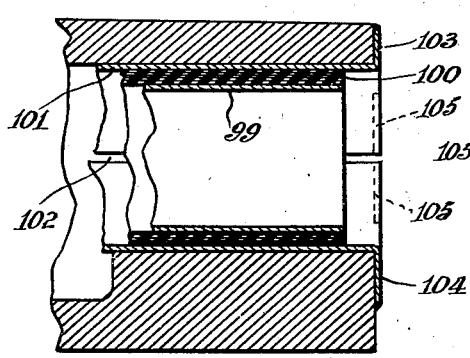
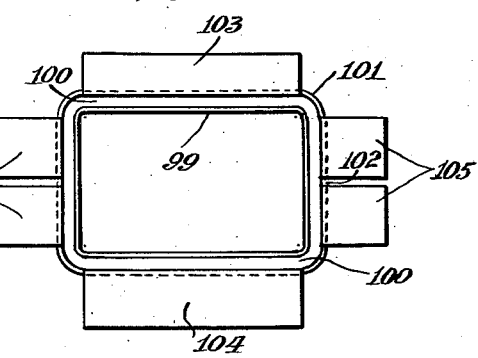
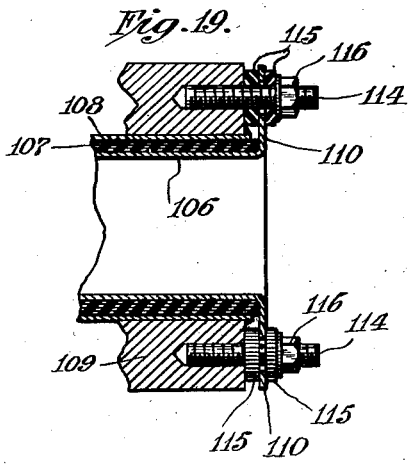
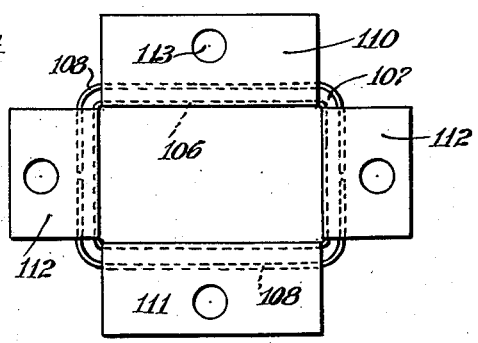

Patented Aug. 17, 1943

2,327,035

UNITED STATES PATENT OFFICE 2,327,035

BUFFER STEM SLEEVE

David W. Gray, Everett, and William B. Rogers, Jr., Dedham, Mass., assignors to Fabreeka Products Company, Inc., Boston, Mass., a corporation of Massachusetts Application October 3, 1940, Serial No. 359,534

7 Claims. (Cl. 308—26)

This invention relates to shock absorbing sleeves for the buffer stems of railroad cars, especially passenger cars, and has for an object to increase the life of such a sleeve and to reduce noise and vibration.

Another object is to provide a device of this class having a shock absorbing sleeve bonded to a wear resisting sleeve in a better and stronger manner than has heretofore been done.

A further object is to enhance the bond of the shock absorbing material in such a sleeve to an inner wear resisting sleeve so that any tendency for the two to separate has been substantially reduced.

Yet another object has been to provide a simple and convenient manner for retaining such a sleeve in place in a buffer stem casting.

Still a further object is to provide an improved method of manufacturing such a sleeve.

A buffer stem has been found to be one of the prime sources of noise and vibration in a railroad passenger car. One previous attempt to eliminate the noise and vibration has been described in the patent to Dwyer et al. No. 2,085,713 dated June 29, 1937. An objection to that construction has been the danger of the inner and outer metal plates becoming loose from the shock absorbing material. According to this invention such disadvantage has been overcome by enhancing the bond between these metal plates and the shock absorbing material.

Referring to the drawings

Fig. 1 is a transverse section through one embodiment of this invention.

Fig. 2 is a longitudinal section through the embodiment illustrated in Fig. 1 and showing the buffer stem passing through the sleeve.

Fig. 3 is an economical construction in which the shock absorbing and wear resisting materials do not extend the full length of the sleeve.

Fig. 4 is an outer side view of a construction in which the wear resisting tube is secured to the casting.

Fig. 5 is an end view of the sleeve shown in Fig. 4 removed from the casting.

Fig. 14 is a modification of the construction shown in Fig. 13 and provided with an outer steel sleeve.

Figure 6:
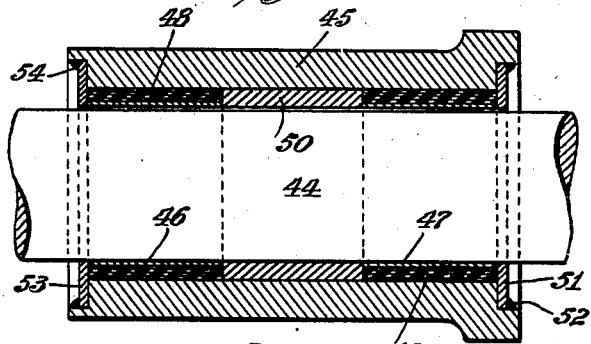
Fig. 6 is a modified construction in which the sleeve is in two parts separated by a spacing member.

Fig. 15 exemplifies a construction in which the outer tube has at least one end bent to engage the ends of the shock absorbing material and therefore hold it in place.

Fig. 16 illustrates a construction in which the outer metal tube is provided with end flanges for engaging the face of the casting.

Fig. 17 is a right end view of the device shown in Fig. 16 but with the sleeve withdrawn from the casting.

Fig. 18 is an end view of a sleeve construction provided with both inner and outer metal tubes and with the inner metal tube being secured to the casting.

Fig. 19 shows a partial longitudinal section through the device of Fig. 18 when in position.

As shown in Figs. 1 and 2 a buffer stem 10 slides in its usual casting 11 and between the casting and stem is provided a sleeve 12 which includes shock and sound absorbing material and prevents a metal to metal contact between the stem and casting. In new cars appropriate clearance for this sleeve should be initially provided but in old cars it may be necessary to reduce the cross sectional area of the buffer stem sufficiently to provide clearance for the desired sleeve and such sleeve may be of the sort shown in any one of the embodiments illustrated. This sleeve comprises in Figs. 1 and 2 an inner wear resisting tube 13, of manganese steel or other appropriate material and of a cross sectional shape to correspond with the buffer stem so that the stem may freely slide therethrough. Where seamless tubes of the desired shape are obtainable such may be used for the inner tube but where not available it becomes necessary to bend plates to provide two opposite channel sections welded together to provide a unitary construction equivalent to a seamless tube.

Surrounding the wear resisting tube is a tube of shock absorbing material of any appropriate type. Specifically, a tube of laminated fabric and rubber layers has been found satisfactory though more layers may be formed than have been illustrated in the drawings. Surrounding the shock absorbing tube 14 is an outer steel tube 15 shown as being constructed in two parts having their edges spaced as shown at 16 for the purpose hereinafter mentioned.

In event the sleeve comprised of the three tubes just described should not fit snugly enough within the casting, shims 17, 18, 19 and 20 may be provided on one or more sides to hold the sleeve tightly in position and prevent rattle between the outer tube 15 and the casting 11. The outer ends of these shims should be welded to the casting. The shock absorbing material 14 is preferably vulcanized to both the inner and outer tubes 13 and 15. To provide a better bond between the shock absorbing material and the inner tube, pointed projections 21 may be formed on the top and bottom outer surfaces of the inner tube, such projections being illustrated in Fig. 2 by the reference numeral 21. Such projections may be conically shaped parts of say $\frac{1}{16}$ or $\frac{1}{8}$ of an inch in height welded to the outer surface of the inner tube 13 for the purpose of biting into the shock absorbing material to better anchor it in place. Wherever an inner wear resisting tube is provided within a tube of shock absorbing material, these pointed projections 21 may be found desirable.

To construct a sleeve having a wear resisting tube within the shock absorbing material, it has been found desirable to first coat the outside of the inner tube with an appropriate rubber cement. Next to the rubber cement is applied a sheet of unvulcanized rubber approximately .010″. A layer of fabric impregnated and coated with uncured rubber is then wrapped around the inner metal sleeve under tension until the shock absorbing material has been built up to the desired thickness. While retaining the layers under tension the ends of the fabric are cut to size so that the two tubes may fit within a two part pressure mold for vulcanizing under pressure of several hundred pounds.

After cutting the ends of the shock absorbing material to the casting size it is desirable to coat the entire surface of the shock absorbing material, including the ends, with talc to facilitate the shock absorbing material being tightly fitted into the mold and to prevent its adhering to the mold after the curing. In a construction like that shown in Fig. 1 in which the outer metal tube is provided, the two parts of the outer tube are put in place before insertion in the mold and vulcanizing. The edges of the two parts of the outer tube are separated sufficiently to allow the pressure used during the molding operation to be applied to the shock absorbing material and for this reason the separation 16 of these edges should be large enough to allow the desired pressure to be applied to the material during vulcanizing. The fabric layers become vulcanized to each other and the material vulcanized to each of the steel tubes. Specifically an eight ounce duck has been found suitable and this is coated on both sides with uncured rubber calendered or frictioned into the fabric so that the rubber and fabric together weigh about twice as much as the fabric alone.

A suitable rubber cement may also be provided between the outer sleeve and rubberized fabric, and sheet rubber also used in the same manner as between the inner steel and the shock absorbing material. Common thicknesses of shock absorbing material include ten to twenty layers of fabric. A pressure upwards of 100 pounds square inch on the mold is suitable and vulcanization takes about one-half hour at 300° F.

The spur-like projections described as having been welded to the inner tube are usually not placed on the side walls but only on the outer surface of the top and bottom of the inner tube and the inner surface top and bottom of the outer steel. An appropriate tension for the rubberized duck during winding has been found to be at least one pound per linear inch of width of fabric. The greater the tension on the fabric, within safe limits, the tighter is the binding action of the fabric upon the inner tube so that both the tension and the shock absorbing material and the spur like projections assist in enhancing the bond between the shock absorbing material and inner tube against longitudinal or other thrusts separating them. After the sleeves have been removed from the hot mold, they are placed in a cold mold and permitted to cool slowly under the same pressure as originally used.

For convenience in manufacture the shock absorbing material may be longer than or project beyond the ends of the inner and outer tubes as shown in Fig. 2. In this event it may be desirable to add additional layers of fabric upon the material 14 before vulcanizing in order that the additional layers or end pieces 22 may be vulcanized to the rest of the material and provide a reenforcement for the bond between the shock absorbing material and outer tube to thus reduce the hazard of the outer tube becoming loosened from the shock absorbing material. Of course this building up of a flange-like portion on the end of the shock absorbing material may also be applied to the ends of the inner tube as has been shown later in Fig. 12. After the unitary sleeve has been formed in the manner just described, it may be inserted into the casting, the shims 17 to 20 being driven between the sleeve and casting on as many sides as is found necessary. The retaining plate 23 holds the sleeve tightly against a shoulder or abutment portion 24 at the opposite end of the casting and this retaining plate 23 may be of the type illustrated in Fig. 1 of Dwyer et al. Patent 2,085,713, in which the plate is of a size to be out of contact with the buffer stem yet hold the end of the sleeve in place by bolts or otherwise. Of course, other known means of fastening the sleeve in place such as is illustrated in the same prior patent might also be used.

The sleeve shown in Fig. 3 is made by the general method described above in connection with Figs. 1 and 2. Since the shock absorbing and wear resisting tubes are not necessary throughout the entire length of the buffer stem or casting, the construction shown in Fig. 3 has been found economical and satisfactory, the spaced inner tubes 25 and 26 of wear resisting material being located adjacent the ends of the casting and around the buffer stem. These tubes are bonded in the same way to the shock absorbing material 27 and 28. The steel outer tube 29 is applied in the aforementioned manner and therefore the edges 30 of the two halves of this tube are separated. This outer tube 29 acts as a spacing element to maintain the tubes of shock absorbing and wear resisting materials separated the desired amount to cooperate with the end portions of the buffer stem. In Fig. 3 the full length of the separator portion of the outer tube 29 has not been shown, the same being illustrated as broken away. Any appropriate type of securing means may be used for holding the sleeve of Fig. 3 in place within the casting.

In Figs. 4 and 5 is shown a construction for a sleeve comprised of an inner wear resisting tube 31 bonded to an outer tube 32 of shock absorbing material, no outer metal tube being used and the sleeve being fastened to the casting 37 by mean of oppositely extending flanges 33 and 34 bent from or formed as projections on the inner tube 31. Suitable holes 35 and 36 are provided in these flanges so that bolts may pass through with a large amount of clearance and thus avoid metal to metal contact between the bolts and the flanges. As shown in Fig. 4 between the face of the casting and each flange is provided a washer 38 of shock absorbing and sound deadening material, a similar washer being provided on the opposite side of each flange. The bolt 40 is first secured into the tapped hole in the casting and tack welding may be used between the bolt and the face of the casting to prevent the bolt from working loose. After that the washers, flanges and nuts 42 are placed in position. A metal washer is shown in Fig. 4 as being placed between the nut 42 and the washer 39. After tightening the nut 42 tack welding 43 is used to prevent the nut backing off or working loose. Even though no outer metal tube may be used in the embodiment of Figs. 4 and 5, the shims previously described may be used if desired. In fact such shims may be used on any of the herein illustrated constructions. Prior to bolting the sleeves of Figs. 4 and 5 in the manner described, spot welding had been tried but this was not found as satisfactory because of the difficulty in securing a good weld between the relatively thin flange and the heavy casting.

In Fig. 6 between the buffer stem 44 and the casting 45 is provided a sleeve comprised of spaced inner wear resisting tubes 46 and 47 around which are secured spaced tubes 48 and 49 of shock absorbing material. A spacer ring 50 of the desired size is placed between these two spaced portions so that any longitudinal thrusts or components on either sleeve portion become transmitted to the other through this spacing ring 50. Preferably the ring 50 is slightly below or outside the surface of the wear resisting plates 46 and 47 so that there is no danger of the stem 44 scraping on the ring 50. End plates 51 and 53 are welded at 52 and 54 for the purpose of retaining the sleeve in place. The two sleeve portions illustrated are preferably separately formed though, if desired, all three portions of the sleeve may be formed as a unit. The possibility of contact between the inner tube and an end plate has not been found serious though, if desired, of course the end plate and inner tube may be kept separated in order to prevent any metal to metal contact between the stem and casting. The means previously described for enhancing the bond between the shock absorbing material and the inner wear tube are preferably used in this and other constructions having an inner tube of wear resisting material contiguous the vulcanized shock absorbing material.

Figure 7:
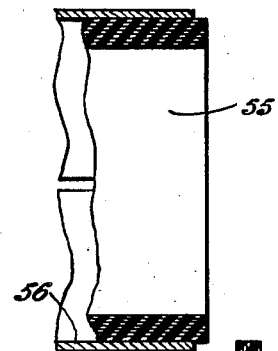
Fig. 7 shows a sleeve without any inner wear resisting material.

In Fig. 7 is shown a sleeve 55 of shock absorbing material having an outer tube 56 but not having any inner tube of wear resisting material. In this case the shock absorbing material 55 may be wound around a mandrel and the outer tube vulcanized thereto under pressure in two operations.

The shock absorbing material is preferably longer than the outer tube so that the end or retaining plates may be in contact with the tube 55 and yieldably retain it in place. Other appropriate means for securing the sleeve in place might be used, such for example as that shown in Figs. 2, 8, 10, 13, 14 or 16.

Figure 8:
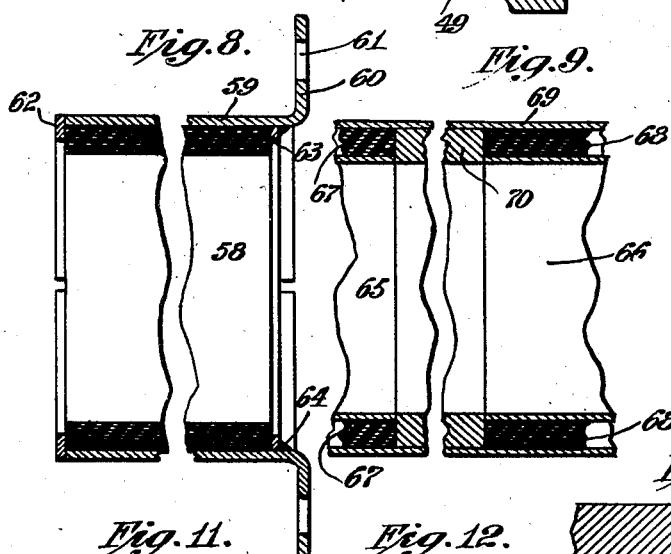
Fig. 8 shows a sleeve of the general type shown in Fig. 7, but being provided with casting securing flanges at one end.

The shock absorbing material 58 in Fig. 8 is secured to the outer tube 59 which is split in two halves, and which is preferably provided with oppositely directed flanges 60 on two or more sides, such flanges being provided with appropriate bolt holes 61. On the other end of the outer tube 59 is provided an inwardly directed flange 62 which may be integral with the outer tube or separately formed and welded thereto as shown in Fig. 8 so that this inturned flange 62 is capable of functioning as an abutment against which the shock absorbing material 58 may be held. An end plate 63 is adapted to engage the opposite end of the shock absorbing material 58, this plate 63 being secured to the outer tube 59 by tack welding 64 as illustrated.

Figure 9:
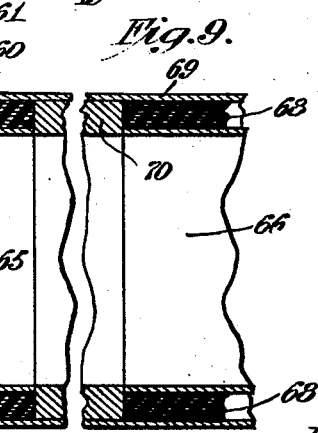
Fig. 9 illustrates a construction similar to that shown in Fig. 3 but provided with a spacing means for the shock absorbing and wear resisting materials.

A construction somewhat similar to that illustrated in Fig. 3 as shown in Fig. 9 in which the inner tubes 65 and 66 of wear resisting material are each surrounded by tubes of shock absorbing material 67 and 68 bonded thereto as previously described and an outer tube 69 is secured to both tubes of shock absorbing material and functions as a spacing means.

As in Fig. 3 the outer tube 69 should be split into two halves although such is not shown in this figure of the drawings. To better transmit any longitudinal thrusts between the inner tubes and the shock absorbing tubes, an additional spacing ring 70 is inserted. The inner surface of this ring is preferably of slightly larger diameter than the inner surface of the wear resisting tubes 65 and 66. Of course such spacing ring 70 may be secured to the outer tube 69 in any appropriate manner.

Figure 10:
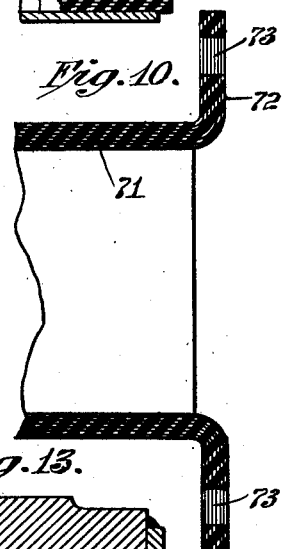
Fig. 10 shows a sleeve of shock absorbing material alone without any metal sleeves attached but in which at least one end of the sleeve is provided with oppositely extending flanges adapted to be bolted or otherwise secured in place.

The sleeve shown by Fig. 10 lacks any inner or outer metal tubes and is only a tube of shock absorbing material 71 having oppositely bent flanges 72 provided with bolt holes 73 for securing the sleeve in place against the end of the casting.

Figure 11:
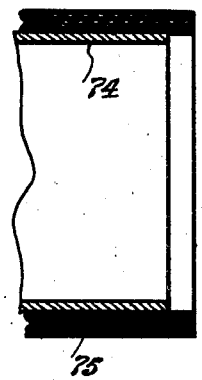
Fig. 11 shows a sleeve in which the shock absorbing material overhangs the wear resisting material.

The embodiment illustrated in Fig. 11 includes an inner tube 74 of wear resisting material bonded to the shock absorbing tube 75 as previously described. This sleeve may be secured in place as shown in the aforementioned patent to Dwyer et al. 2,085,713 or as shown in Figs. 2, 6 or 10 herein.

Figure 12:
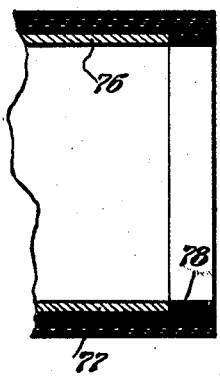
Fig. 12 is a modification of the construction shown in Fig. 11.

The modification shown in Fig. 12 includes the inner tube 76 of wear resisting material, the bonded tube of shock absorbing material 77 and an additional flange-like portion of shock absorbing material 78 secured as described above by vulcanizing. This construction may also be secured as was described in connection with the embodiment shown in Fig. 11.

Figure 13:
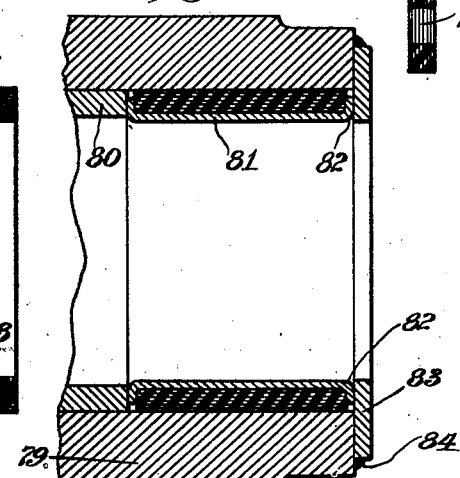
Fig. 13 shows a sleeve in which the wear resisting material has been provided with bent ends to better retain the shock absorbing material bonded thereto.

The casting 79 shown in Fig. 13 receives a spacing ring 80 separating two short sleeves as illustrated in Fig. 6 except that in this construction the inner wear resisting tube 81 of each sleeve has its end portions 82 bent at 82 as illustrated to provide flanges or stops by means of which the bond between the shock absorbing material and inner tube is enhanced when these flanges are vulcanized to the end surfaces of each shock absorbing tube. The securing plate 83 is preferably held in place by welding 84 and the inner surface of this plate should be large enough so as not to contact with the buffer stem sliding through this sleeve.

While a metal to metal contact does exist from the stem to the inner tube 81 and thence through the bent or flanged ends to the retaining plate 83 and the casting 79, such metal to metal contact has not been found objectionable, though, if desired, such metal to metal contact may be eliminated by the provision of washers of shock absorbing material between the securing plate 83 and the contiguous bent flanges 82 of the inner tube.

In Figure 14 is shown a construction somewhat similar to that shown in Fig. 13 except that no spacing ring is used and the inner tube 85 has its opposite ends 86 bent as illustrated to engage the end portion of the shock absorbing tube 87. In addition this construction has an outer tube 88 which is preferably slightly shorter than the length of the inner tube between the outer faces of its bent flanges.

Any appropriate means for securing the sleeve in place may be used such, for example, as the plate 89 welded at 90 to the casting through which the buffer stem slides. It should be understood that wedges of the type shown in Fig. 1 may be used in any of these modifications herein illustrated. In addition to the bond between the shock absorbing material 87 and the inner tube 85 being strengthened by the bent flanges 86 on the inner tube, it will be understood that the connection of the shock absorbing material to this inner tube may also be strengthened by having the shock absorbing material wound under tension as previously described or providing the spur-like projections described in connection with Fig. 2 between the inner tube and shock absorbing material, or both such additional bonding features may be used in addition to the bent ends for the inner tube.

In Figure 15 the sleeve comprises the inner tube 91 around which the shock absorbing material 92 is wound under tension as described and the union of these tubes 91 and 92 strengthened by the projections 93 formed on the outer upper and lower surfaces of the inner tube as previously described. The outer tube 94 is made as has been previously described except that the end portions of this outer tube are inwardly bent to engage the ends of the shock absorbing material 92 and thus provide a stronger bond to the outer tube than is possible merely by vulcanizing. As previously described the outer tube should be made in two halves separated by a spaced portion 96 for the purpose described above. A retaining plate 97 may be secured by welding 98 as illustrated. Other ways for retaining the sleeve of Fig. 15 may be used. For example, the inner tube 91 may be secured to the casting or the outer tube 94 may also be secured to the casting by outwardly bent flanges in addition to the inwardly bent flanges 95.

In Fig. 16 the sleeve comprises an inner tube of wear resisting material 99 contiguous a surrounding tube of shock absorbing material 100 vulcanized to an outer tube 101 made in two halves as described above with a space 102 separating such halves. Oppositely bent flanges 103 and 104 as well as the oppositely bent lateral flanges 105 may be provided for fastening the sleeve to the end face of a casting by bolts not shown or by tack welding along the edges of the flanges. It will be noted the side flanges 105 are made in two parts because of the space 102 separating the two halves of the outer tube 101.

The inner tube 106 in Fig. 19 is vulcanized to the shock absorbing material 107 and the outer tube 108 shown as being held in position within the casting 109 by means of the flanges 110, 111 and 112 formed integrally with the inner tube 106. Such flanges may be provided with the usual bolt holes 113 so that bolts 114 may hold such flanges fastened to the casting 109 but separated by washers 115 so that no metal to metal contact takes place between the inner tube 106 and the casting 109. As described above in connection with Fig. 4 the studs 114 may be tack welded to the casting and the nuts 116 tack welded to the studs 114 to prevent any of them from becoming loose. Inasmuch as the lateral flanges 112 are formed on the integral inner tube 106 it is not necessary for these flanges to be split along their transverse center line as was the case in Fig. 17.

All the constructions illustrated having an inner wear resisting tube within a tube of shock absorbing material may have the shock absorbing material wound on the inner tube under tension to provide a binding action thereon in addition to the vulcanizing and the bond between these two tubes may also be enhanced in each case by the provision of the cone-like projections 21 shown in Fig. 2, regardless of whether or not such projections are shown in each of the herein figures of the drawings.

Among the advantages of this invention may be mentioned the longer life and wearing qualities of the improved sleeves of this invention. One factor contributing such longer life is believed to be the better union between the inner manganese steel wear resisting tube and the contiguous tube of shock absorbing material. Such better union is attained by either or both the winding of the shock absorbing material under tension as described and the cone-like projections on the outer top and bottom surfaces of the inner tube which cut into the shock absorbing material. Similar projections are also used between the shock absorbing material and the outer tube. The provision of bent flanges on either the inner or outer tube may enhance the bond between that tube and the contiguous tube of shock absorbing material. The provision of spacing means between two separated sleeve portions may assist in transmitting longitudinal thrusts from one sleeve portion to the other.

We claim:

1. A unitary buffer stem sleeve comprised of an inner tube of wear resisting material around which are wound vulcanized layers of rubber and fabric, the bond between the laminated material and the wear resisting tube being enhanced by the fabric being under substantial tension whereby said tube is gripped due to the tension in the fabric and also by the laminated material being vulcanized to said tube and whereby said inner tube and said laminated material constitute an assembly substantially non-separable under conditions of use.

2. A unitary buffer stem sleeve comprised of an inner tube of wear resisting material around which are wound vulcanized layers of rubber and fabric, the bond between the laminated material and the wear resisting tube being enhanced by the fabric being under substantial tension whereby said tube is gripped due to the tension in the fabric and also by the laminated material being vulcanized to said tube, and also by the presence of cone-like spurs fixed to the outside of the top and bottom sides of said tube and projecting into the laminated material.

3. A unitary buffer stem sleeve comprised of an inner tube of wear resisting material around which are wound vulcanized layers of rubber and fabric, the bond between the laminated material and the wear resisting tube being enhanced by the fabric being under substantial tension whereby said tube is gripped due to the tension in the fabric and also by the laminated material being vulcanized to said tube, and also by the presence of cone-like spurs fixed to the outside of the top and bottom sides of said tube and projecting into the laminated material, an outer steel tube also vulcanized to the shock absorbing material and also provided on the inner upper and lower surface with cone-like spurs adapted to extend into the shock absorbing material to enhance the bond with such material.

4. A shock absorbing buffer stem guide comprising a one-piece seamless tubular member formed of a multiplicity of alternate layers of woven textile fabric with intervening thin layers of rubber, the fabric and rubber layers being wound under tension and vulcanized together under pressure and two channel-like wear resisting metal members compressed upon opposite sides of the tubular member, so as to form an integral and substantially non-separable unitary structure.

5. A shock absorbing buffer stem guide comprising a one-piece seamless tubular member formed of a multiplicity of alternate layers of woven textile fabric with intervening thin layers of rubber, the fabric and rubber layers being wound under tension and vulcanized together under pressure and a metallic wear resisting sleeve vulcanized under pressure to the tubular member so that said tubular member and said wear resisting sleeve form an integral unit which is substantially non-separable under conditions of use.

6. A unitary fabricated shock absorbing buffer stem sleeve comprising a seamless inner tube of wear resisting material, a plurality of superposed convolutions of single-ply shock absorbing material wrapped around said inner tube under tension to form a thickness of material having a minimum of resiliency and a sectional steel tube fitted around said convolutions, said tubes and convolutions being compressed together under heat and pressure to form a unitary structure, the component parts of which are inseparable when said sleeve is in use.

7. A device of the kind described in claim 6 characterized by spurs on the surfaces of said inner and outer tubes adjacent the shock absorbing material.

DAVID W. GRAY.
WILLIAM B. ROGERS, Jr.